Sept. 21, 1965　　　G. H. COLLINS　　　3,207,364
NAIL DISTRIBUTORS

Filed Sept. 19, 1963　　　　　　　　　　3 Sheets-Sheet 3

# United States Patent Office 3,207,364
Patented Sept. 21, 1965

3,207,364
NAIL DISTRIBUTORS
George H. Collins, Lynn, Mass., assignor to United Shoe Machinery Corporation, Boston, Mass., a corporation of New Jersey
Filed Sept. 19, 1963, Ser. No. 309,976
3 Claims. (Cl. 221—291)

This invention relates to article feeders, and more especially to improved distributor mechanism for fasteners including nails or the like which are required to be inverted in the course of their delivery. The invention is herein illustrated as employed in nail distributing mechansm of the type adapted for use in heel attaching machines, and accordingly in some respects resembles that disclosed in an application, Serial No. 254,297, filed January 28, 1963, in the names of Fred T. MacKenzie et al. It will be appreciated that applicability of the invention is not thus limited.

Despite careful engineering design and numerous improvements over many years in the art of feeding nails from a hopper and through a raceway, occasional stoppages in their flow still seem inevitable. Sometimes this is due to defective nail making, sometimes it is caused by foreign matter such as oil, dust or grit, and sometimes clogging happens for no apparent reason. Failure continuously to direct nails to their point of driving can be costly from the standpoint of loss in production; it is also particularly exasperating to an operator, not usually a mechanic, who is obliged to dismantle complex mechanism to locate the trouble and then take more time to reassemble the parts before resuming nailing. An especially notable source of annoyance with respect to nail distributors resides in the means for inverting nails end for end in the course of their passage, the difficulty primarily being that once jammed, the nail is not readily accessible for removal.

It is a primary object of this invention to provide a nail distributor of the inverter type which shall be of simple construction and easily assembled and disassembled to facilitate correction of any possible nail jam. With this object in view, and in accordance with a feature of the invention, there is provided in combination with a rotary member having at least one diametrical nail receiving bore, a two-part housing therefor, one part of the housing having exit passageways and being formed cylindrically to enclose more than half of the member circumferentially, and the other part of the housing normally circumferentially enclosing substantially the remainder of the member, said other part complementally forming with the one part nailways registering with the bores of the member and being quickly disconnected from the one-part whereby exposure and correction of a nail jam in the bore may be easily affected.

The above feature and other structural details will now be more particularly described in connection with an illustrative embodiment of the invention, and with reference to the accompanying drawings, in which.

General construction and operation of the illustrative distributor are largely as described in the above-mentioned MacKenzie et al. application. It will accordingly suffice for present purposes to describe only so much of the distributor as is essential to an understanding of the instant invention.

Figure 1:
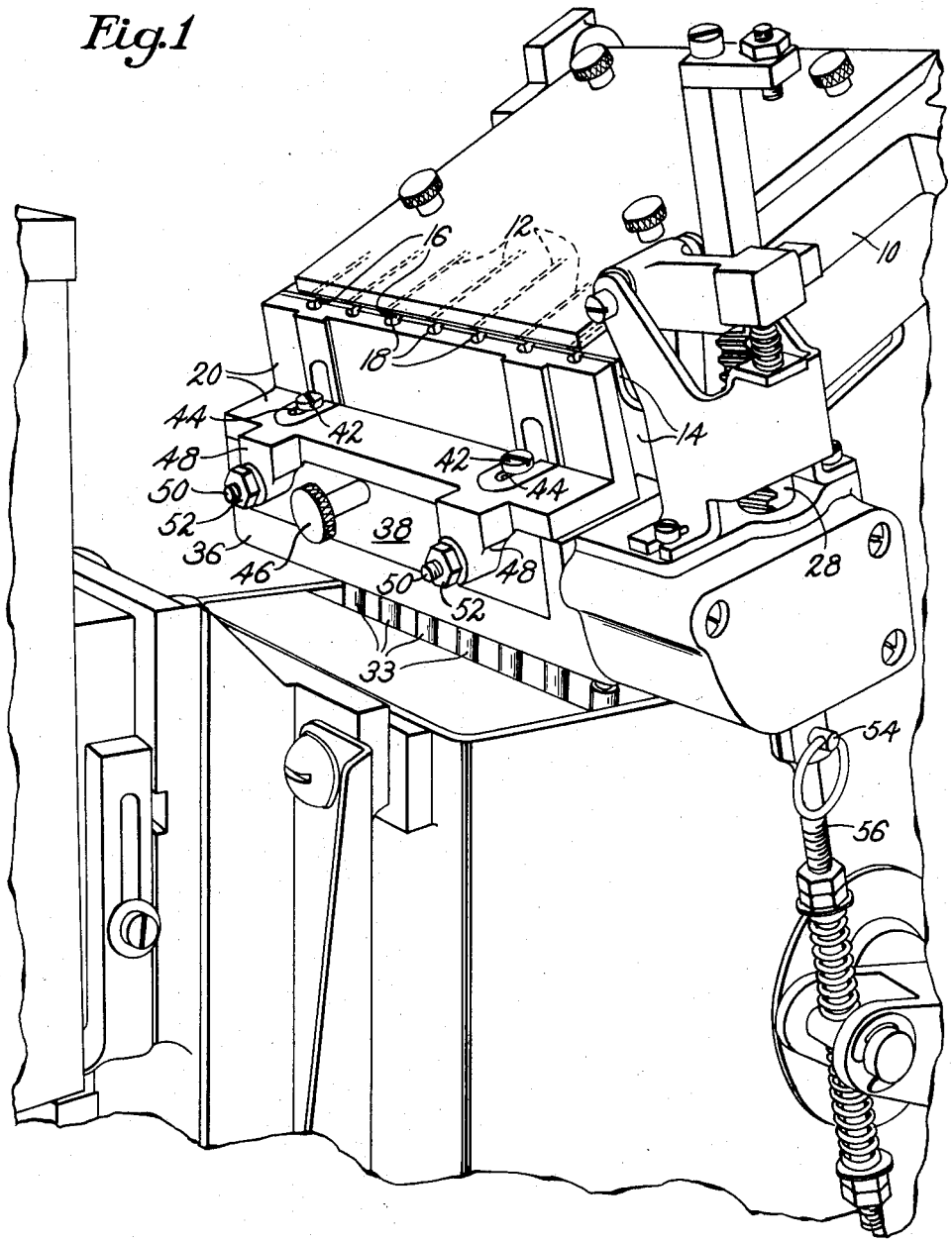
FIG. 1 is a perspective view of a nail distributor of the inverting type as provided for a heel attaching machine.

A raceway block 10 has a plurality of inclined raceways 12 (FIG. 1) into the upper ends of which nails, hanging by their heads, are fed from a suitable source such as a tiltable hopper. In addition to the hopper and block 10, the distirbutor comprises a transfer slide 14 having vertical slots 16 for receiving successive lowermost nails in the raceways 12 and delivering the nails to vertical channels 18 of an angular front plate 20.

Figure 2:
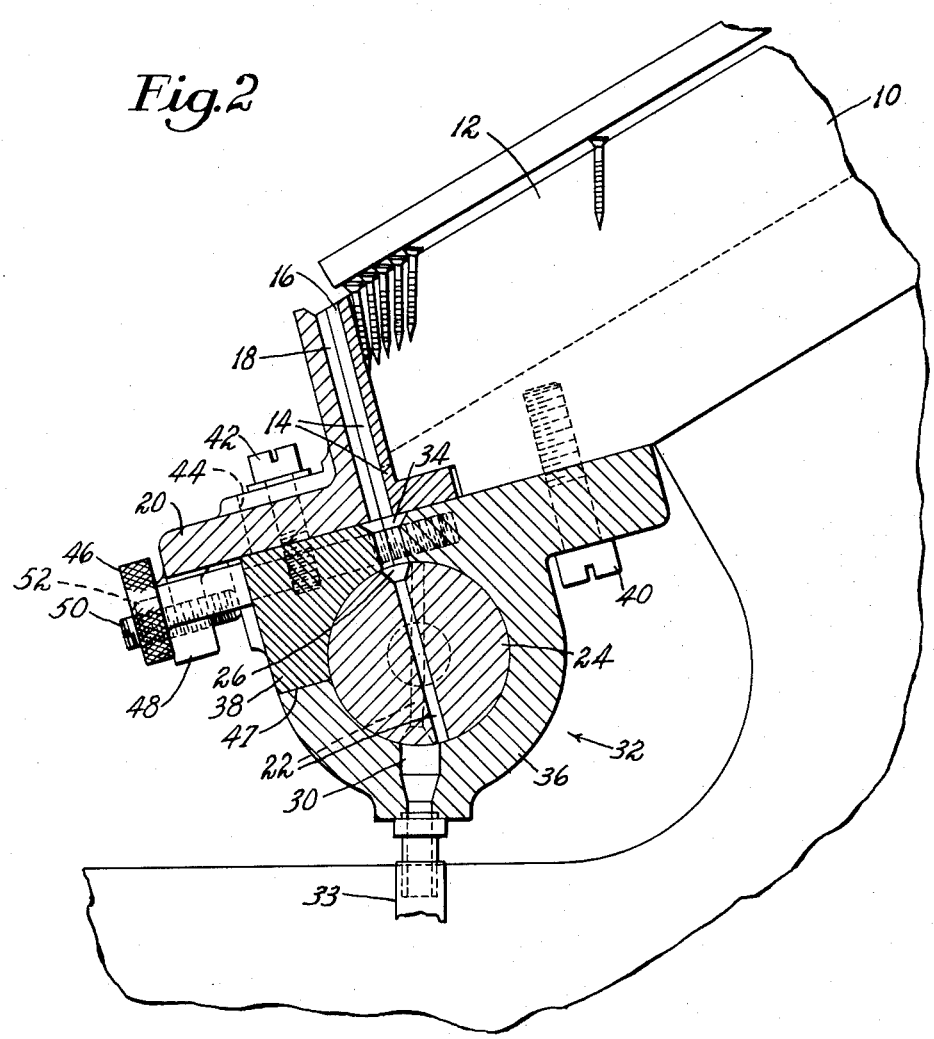
FIG. 2 is a view in section showing an inverting bar housing as assembled with raceway block mechanism and showing the bar in two operative positions.
Figure 3:
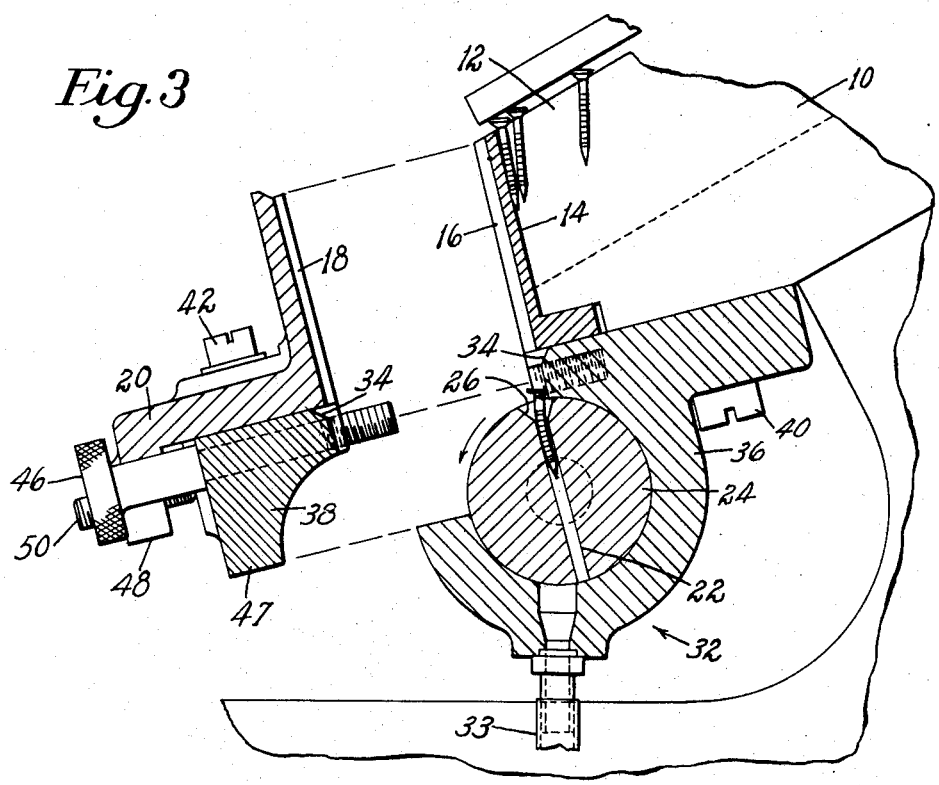
FIG. 3 is a view similar to FIG. 2 showing the manner in which a portion of the housing is removable to provide access to a jammed nail.

A fairly continuous flow of nails is normally experienced up to this point. From the channels 18 the nails fall into bores 22 (only one shown) formed diametrically in a cylindrical inverting bar 24 (FIGS. 2, 3), their heads resting on flared entrance portions 26 of the bores. It will be understood that the bar 24 is yieldingly rotated to carry nails counterclockwise (as seen in FIGS. 2 and 3) between its receiving position and its inverted or delivery position (shown by dashed lines in FIG. 2) by suitable means including a reciprocable rack 28 (FIG. 1) and a pinion (not shown) operatively connected to the bar 24. Limit stops (not shown) determine the receiving position and a discharge position wherein the inverted nails may descend through alined exit passageways 30 of a composite inverter housing 32 (FIGS. 2 and 3). The lateral feeding strokes of the slide 14 are of course coordinated with the oscillation or rotation of the inverting bar 24, the slide having, for instance, operative connection with the rack 28 as set forth in the application referred to above. Thus in normal operation each inversion of the bar should simultaneously deliver a plurality of nails, in this case seven, for descent by clearance from the passageway 30 and through connecting tubes 33.

In descending from the channels 18 into the inverting bores 22 the nails move heads-up through an upper enlarged passageway 34 afforded by adjacent faces of portions 36, 38 comprising the housing 32. The latter circumferentially encloses the bar 24 in the manner of a bearing sleeve, the portion 36 being secured to the block 10 by screws 40 (FIG. 2, 3) and desirably extending more than 180° about the bar, preferably enclosing about three quarters of its circumference. The bar enclosing portion 38 is mounted for easy removal from assembled relation as will next be explained.

The portion 38 is tapped to receive a pair of screws 42, 42 extending through slots 44, 44, respectively, formed in the angular front plate 20. The detachable assemblage 20, 38 is conveniently secured in operative position by a suitable quick-release means such as a single knurled screw 46 which is threaded into the inverter housing portion 36, a lower flat face 47 of the portion 38 abutting a corresponding face of the fixed portion 36 to hold the removable portion from turning about the axis of the screw 46. For insuring that the channels 18 and passageways 34 remain nicely alined to accommodate the nails as initially determined by the screw 42, 42 spaced depending lugs 48 formed on the front of the plate 20 are each threaded to reecive an adjustable stud 50 which is engageable endwise with the portion 38, and secured in selected position by lock nuts 52, 52 respectively.

From the foregoing it will be appreciated that, when a nail jam occurs, an operator only need loosen and remove the screw 46 to permit a quick disconnection and removal of the assemblage 20, 38 in a radical direction from the bar 24, as indicated in FIG. 3, whereupon exposure of, and access to, the clogged inverter bore 22, or to the jammed slide 14 and channels 18 is gained and corrective action may be taken. The flared entrance portions 26 of the jammed inverting bar normally will not have rotated counterclockwise beyond the passageway 34. In the very unlikely situation that a jam occurs when the portions 26 are substantially alined with the exits 33 of the housing portion 36, a ring-pin 54 (FIG. 1) connecting the lower end of the rack 28 with a springpressed actuator rod 56 may be pulled out to free the rack for manual movement to dislodge the caught nail, whereupon the ring-pin is reinserted. Thus only a short time and very little mechanical know-how is needed in disassembling and precisely reassembling the described nail distributor. Moreover the parts are few and of simple design, and hence lend themselves to low cost manufacture.

Having thus described my invention what I claim as new and desire to secure by Letters Patent of the United States is:

1. In a nail distributor of the type having a rotary nail inverting bar, and means for rotating the bar between a nail receiving position and a nail delivery position, a two-part housing for the bar, one part of the housing having exit passageways alined with the delivery position and being formed cylindrically to enclose a portion of the bar circumferentially, and the other part of the housing circumferentially enclosing substantially the remainder of the bar and complementally forming, with the said one part of the housing, nailways registering with the receiving position of the bar, and means providing quick disconnection of the two housing parts to facilitate their separation and the correction of a nail jam.

2. In a nail distributor comprising a nail block having inclined raceways for slidably supporting nails with their heads uppermost, an angular front plate having a plurality of channels, and a transfer slide having slots, the transfer slide being laterally movable between a nail receiving position in which its slots are in register with the ends of the raceways and a nail delivering position in which its slots are in register with the channels of the plate, an inverting bar having diametrical bores spaced from and alined with the lower ends of the channels, and a composite housing circumferentially enclosing the bar and permitting its rotation between nail receiving and nail delivery positions, one portion of the housing being secured beneath the transfer slide to the nail block and having exit passageways in register with the nail delivery position of the bar, another portion of the housing having detachable connection to said one portion of the housing whereby easy access may be had to said channels and slots, complemental nailways formed in the respective housing portions in register with the nail receiving position of the bores of said bar, and means adjustably securing said other portion of the housing to the underside of said front plate.

3. In a nail distributor of the inverting type comprising a nail block formed with inclined raceways for slidably supporting nails by their heads, a stationary member in front of the block and formed with vertical nailways laterally offset from the delivering ends of the raceways, means for transferring nails from the raceway delivering ends to the vertical nailways, and a rotary inverting bar for turning the nails end for end as they are received from the nailways, the improvement which consists in a two-part commbination bearing and circumferential housing for the bar, one for the two parts being secured to the nail block and the other part mounting the member, said parts having confronting faces, said faces being provided with mating grooves to form passages communicating with the nailways and means releasably securing two parts together to facilitate their separation in a radial direction.

References Cited by the Examiner

UNITED STATES PATENTS

| | | | |
|---|---|---|---|
| 671,731 | 4/01 | Montambault | 221—93 |
| 1,325,752 | 12/19 | Pope | 221—93 |
| 2,606,359 | 8/52 | Stadthaus | 221—225 |
| 2,879,918 | 3/59 | Zubal et al. | 221—93 |
| 2,918,198 | 12/59 | Kjellsen et al. | 221—93 |

RAPHAEL M. LUPO, *Primary Examiner.*